July 2, 1963  H. J. WIER, SR  3,095,601
FISH SCALER AND CLEANER DEVICE
Filed Jan. 16, 1961
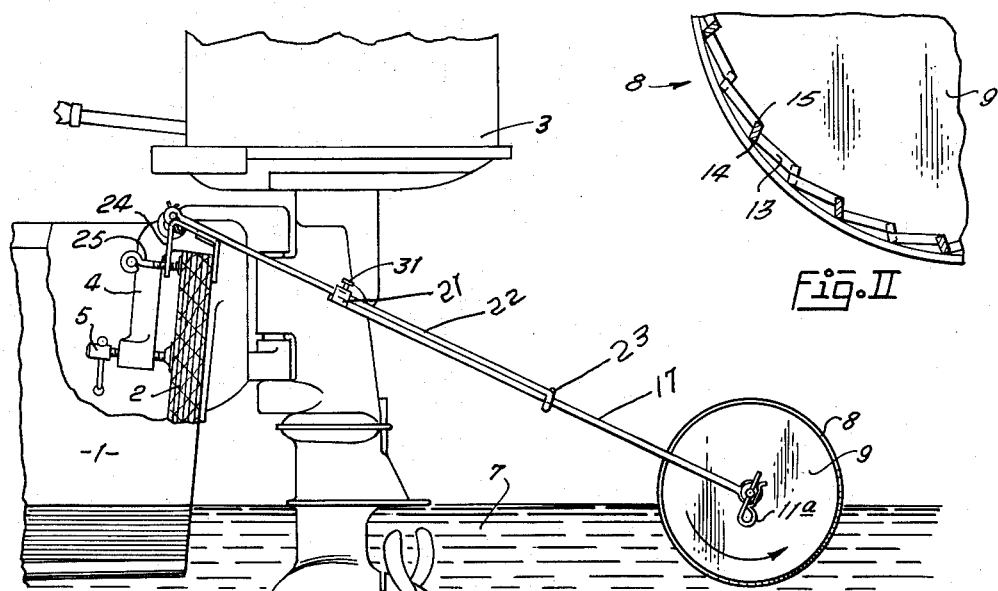
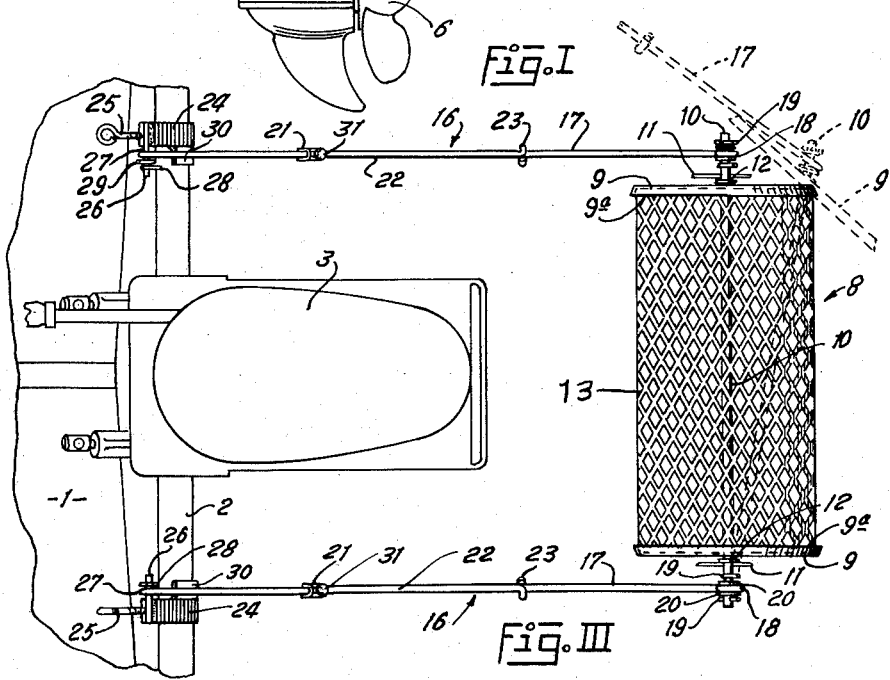
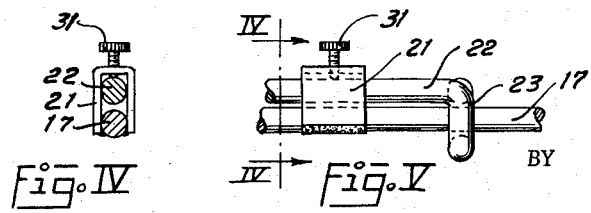
INVENTOR
Harvey J. Wier, Sr.
BY Howard E. Moore
ATTORNEY 3,095,601
FISH SCALER AND CLEANER DEVICE
Harvey J. Wier, Sr., P.O. Box 124, Opelousas, La.
Filed Jan. 16, 1961, Ser. No. 82,809
6 Claims. (Cl. 17—5)

This invention is concerned with a device for removing scales or cleaning fish, and is particularly concerned with a device attachable to the rear of a boat in trailing relationship in the water as the boat moves forward, and having a container thereon in which fish are placed, and which automatically removes the scales and intestines from the fish as it is caused to rotate in the water by the forward motion of the boat or the prop wash from the boat propeller.

A common and distasteful chore for fishermen is the cleaning of the catch after a fishing expedition, which includes the removal of the scales of the exterior of the fish, and the removal of the intestines and other internal organs. This task has customarily been performed by hand by use of a knife with which the scales are scraped from the fish and the inner organs are removed by slitting the stomach of the fish and removing same by hand.

This invention is intended to provide means for automatically removing the scales and inside organs from the fish as the fisherman returns to shore in his boat, thus eliminating the distasteful task of cleaning the fish by hand.

The device for carrying out my invention consists of a hollow cylindrical drum made of expanded metal or other suitable mesh material, having offset portions extending thereinto, and offset portions extended outwardly thereof. The cylindrical drum is rotatably supported on a suitable axle in trailing relationship behind the boat. Fish may be placed in the cylindrical container, and the container is lowered into the water behind the boat, preferably in line with the prop wash of the propeller, so that as the boat moves forward the prop wash of the propeller and the resistance of the water against the outwardly offset elements of the mesh material, will cause the cylindrical container to rotate rapidly. The fish are cast about in the container against the inwardly turned projections on the mesh material, removing the scales therefrom and the turbulence of the water and the vacuum created therein by the prop wash removes the inner organs from the fish which are slit open along their stomachs before placing them in the container.

It is, therefore, a primary object of the invention to provide a fish cleaning apparatus to be towed behind a boat which is operated by the forward motion of the boat in the water and the prop wash from the propeller on the boat to remove scales, inner organs and other undesirable parts of the fish.

Another object of the invention is to provide fish cleaning apparatus arranged to be attached in trailing relationship behind a boat, including a rotatable cylindrical container having perforations or openings spaced thereabout and inwardly extending protrusions therein to remove scale and other undesirable portions of the fish, and which allows the waste material of the fish to pass outwardly through the perforations or openings in the wall of the container.

A still further object of the invention is to provide such a fish cleaning device wherein the rotatable container is adjustably attached by telescoping arms to the rear of the boat so it can be properly spaced from the rear of the boat and placed in proper position in the water to intercept the prop wash from the propeller.

Other and further objects of the invention will become apparent upon reading the detailed specification hereinafter following, and by referring to the drawing annexed hereto and made a part hereof.

A suitable embodiment of the invention is shown in the attached drawing, wherein:

FIGURE I is a side elevational view of the fish cleaning device attached to the rear of the boat in trailing relationship in the water, and showing a fragmentary side elevational view of the rear of the boat and the motor and propeller attached thereto, and further showing a cutaway portion of the rear of the boat and a fragmentary cross-section of the transom of the boat, illustrating the attachment of the adjustable telescoping towing arms for the fish cleaner towed behind the boat;

FIGURE II is a fragmentary, cross-sectional view of the wall of the fish cleaning container, illustrating the inwardly and outwardly offset surfaces of the foraminous material of the wall, which facilitates the rotation of the container, and provides surfaces for engaging the fish inside the container for removing the scales therefrom;

FIGURE III is a top plan view of the fish cleaning device attached to the rear of the boat in trailing relationship therewith;

FIGURE IV is a cross-sectional view taken on the line IV—IV of FIG. V;

FIGURE V is a fragmentary, side elevational view showing the adjustable slidable connection between the telescoping rods or arms constituting the towing arms for the fish cleaning receptacle.

In the drawings, numeral references are employed to designate the various parts of the devices shown therein, and like numerals indicate like parts throughout the various figures of the drawings.

The numeral 1 indicates a conventional boat having a transom wall 2 at the rear end thereof to which is attached a motor 3 which drives a propeller 6 to propel the boat through the water. The motor 3 is attached to the transom 2 of the boat by means of a clamp 4 which extends thereover and is held in place thereto by means of a set screw 5, of which there may be a plurality.

The container, drum or receptacle 8, which as shown is cylindrical in contour, is arranged to be attached in rotative trailing relationship behind the boat in the manner hereinafter described.

As shown, the rotatable container 8 is made of expanded metal which is formed in the shape of a hollow cylinder, which may be closed at the outer ends by circular plates 9 having inwardly turned flanges 9a thereon, which slip over the ends of the cylindrical body of the container 8. The container 8 is rotatably mounted on a shaft 10 which extends longitudinally and centrally thereof through the end plates 9, the said end plates 9 being rotatable about the shaft 10.

The container 8 is held on the shaft 10 by means of hairpin keys 11, each having a leg thereon extendable through a hole extending transversely through the shaft 10, and having another leg thereon arranged to resiliently engage the shaft. A representative form of such hairpin key 11 is indicated in FIG. I at 11a.

Spacer washers 12 are interposed between the hairpin keys 11 in the end plates 9 to prevent longitudinal movement of the container 8 on the shafts 10, but permitting the container 8 to rotate about the shaft 10.

The intersecting mesh elements 13 of the wall of the container 8, which as shown are expanded metal, are turned angularly with respect to the longitudinal axis of the container 8 to provide angular offset edges 14 about the outer periphery of the wall of the container 8 and corresponding angularly disposed inner extending surfaces 15 about the inner side of the wall of the container 8, for the purposes hereinafter explained.

It will be understood that the wall of the container 8 could be made of other foraminous perforated material, having outer and inner offset blades or extensions similar to the offset surfaces 14 and 15 to perform the function hereinafter described. However, it has been found that expanded metal is more convenient and suitable for forming the wall of the container 8.

The container 8 is attached in trailing relationship behind the boat 1 by means of adjustable telescoping arms 16 which are attached to the container and to the boat in the manner hereinafter described.

The arms 16 are made up of telescoping adjustable rods 17 and 22.

The rods 17 each has an eye 18 formed on the outer end thereof which may be slipped over the ends of the axle 10 and are held thereon by removable hairpin keys 19 attached to the shaft 10, of the same type shown at 11a in FIG. I, and are detachably secured to the shaft 10 in the same manner as was described in reference to the hairpin keys 11. Spacer washers 20 are interposed between the hairpin keys 19 and the eyes 18 of the rods 17.

A C-bracket 21 is securely attached, as by welding, to the other end of each rod 17.

Each of the rods 22 has an eye 23 formed on the outer end thereof which are slidably disposed about the rods 17. The rod 22 extends through the C-bracket 21, and may be attached thereto in adjusted relationship by means of a set screw 31.

A C-clamp 24 is provided for attachment of the inner ends of the rods 22 to the transom 2 of the boat 1. Each C-clamp 24 is arranged to be placed over the transom 2 and clamped in place thereto by suitable set screws 25.

Each C-clamp 24 has a laterally extending pin 26 secured thereto as by welding, and the inner end of each rod 22 has an eye 27 formed thereon. The eyes 27 are arranged to be placed over the pins 26 and are held thereon by means of hairpin keys 28 of the same construction as that shown at 11a. Spacer washers 29 are interposed between the hairpin keys 28 and the eyes 27.

An inwardly extending guard 30 is provided on each of the C-clamps 24, each of which is arranged to extend under a rod 22 to limit the downward movement of the rods 22 with relation to the C-clamps 24 and the rear of the boat. Thereby the guards 30 serve the purpose of holding the container 8 upward in the water as it is towed behind the boat.

The operation and function of the fish scaler and cleaner device is described as follows:

As shown in FIG. III in broken lines, the end plate 9 may be removed from the end of the container 8 by removing the hairpin key 11 to allow the end plate 9 to be moved outwardly on the axle 10 to sufficient extent to release the flange 9a thereon from the wall of the container 8, thus permitting the axle 10 to be moved laterally to sufficient extent to allow fish to be placed in the containers 8.

Prior to placing the fish in the container 8, the abdomen of the fish may be opened by cutting a slit therealong so as to permit the internal organs of the fish to be removed in the manner described. After the fish is placed in the container 8, the plate 9 is replaced on the end thereof and the key 11 is replaced to hold the end plate thereon.

The arms 16 are assembled by sliding the eyes 23 on the shafts 22 over the shafts 17, and extending the shafts 22 through the C-bracket 21. The C-clamps 24 are placed on the transom 2 of the boat 1 in spaced relationship, the eyes 27 are placed over the pins 26, and secured thereto by means of the hairpin keys 28. The lengths of the arms 16 are adjusted so that the container 8 will be disposed in trailing relationship behind the boat, in spaced relationship to the propeller 6. Such adjustment is made by sliding the arms 17 and 22 outwardly or inwardly, as may be desired, and securing same in adjusted relationship by means of the set screws 31.

Preferably the container 8 should be placed in such position in the water 7 behind the boat 1 so that it will intercept the prop wash from the propeller 6, but will not come in contact with the propeller. It will be noted that the stop members 30 hold the container 8 upwardly in the water and prevent it from sinking too low in the water.

As the boat 1 is propelled forward in the water, the container 8 will be caused to rotate by the resistance of the water against the outwardly extending offset surfaces 14 striking them in the direction indicated by arrow in FIG. II, and such rotation will also be facilitated by the prop wash from the propeller 6. The container 8 rotates very rapidly in the water as the boat moves forward, and the fish in the container are caused to be thrown about therein and strike against the inwardly turned surfaces 15, removing the scales therefrom. The prop wash from the propeller also causes a great turbulence in the water in the vicinity of the trailing container 8 to aid in the turbulence and agitation of the fish, and the prop wash also causes a partial vacuum in the vicinity of the container, which actually draws the intestines and other organs from inside the fish. The removed scales, inner organs and other foreign material from the fish is allowed to pass outwardly through the perforations provided by the foraminous material of the wall of the container 8 and in a very short time the fish are completely cleaned, with all scales removed therefrom and the organs removed from the insides thereof, so that when the fisherman reaches the shore, he can open the container and remove the fish which are completely cleaned and ready for cooking.

It will thus be seen that I have provided means for automatically cleaning fish by forward motion of a boat, thus eliminating the necessity of cleaning the fish by hand.

It will be understood that other and further embodiments of my invention may be made without departing from the spirit and scope of the appended claims.

Having described my invention, I claim:

1. In a device for cleaning fish adapted to be towed behind a boat; an elongated hollow cylindrical container having a perforated wall and end closures; a plurality of blade members extending angularly inwardly of the wall, arranged to contact fish placed in said container to remove the scales therefrom as the container rotates in the water as it is being towed behind a boat; a plurality of angularly disposed offset elements extending outwardly of the wall arranged to contact the water as the container is towed through the water by a boat to thereby rotate the container; towing means attachable to a boat in position to extend rearwardly thereof; said towing means including spaced arms embracing opposite ends of the container; and means for rotatively attaching the ends of the container to the ends of the arms.

2. The combination called for in claim 1 wherein the wall of the container is formed of expanded metal and the inwardly extending blade members and the outwardly extending offset elements are formed by the opposite edges of the mesh of the expanded metal.

3. The combination called for in claim 1 wherein the towing means is adjustable in length whereby the container may be placed in desired spaced relationship in the water behind the boat.

4. The combination called for in claim 1 wherein at least one of the end closures is removable to allow the insertion and removal of fish into and from the container.

5. In combination with a boat having an engine mounted at the rear thereof with a propeller driven by the engine arranged to extend below the surface of the water to propel the boat therethrough; a fish cleaning device comprising, an elongated hollow cylindrical container having a perforated wall and end closures; a plurality of blade members extending angularly inwardly of the wall, arranged to contact fish placed in said container to remove the scales therefrom as the container rotates in the water as it is being towed behind the boat; a plurality of angularly disposed offset elements extending outwardly of the wall arranged to contact the water as the container is towed through the water by the boat to thereby rotate the container; towing means attachable to a boat in position to extend rearwardly thereof; said towing means including spaced arms embracing opposite ends of the container; means for rotatably attaching the ends of the container to the ends of the arms; the said container being positioned in the water behind the propeller in position to intercept, and be surrounded by, the prop wash from the propeller, whereby the turbulence in the water and the partial vacuum caused thereby in the water causes agitation of the fish in the container to propel same against the inner blades and draw the intestines and other internal organs from inside the fish and facilitate the removal of the scales therefrom.

6. The combination called for in claim 5 wherein the wall of the container is formed of expanded metal and the inwardly extending blade members and the outwardly extending offset elements are formed by the opposite edges of the mesh of the expanded metal.

References Cited in the file of this patent
UNITED STATES PATENTS

| | | |
|---|---|---|
| 2,331,855 | Vucassovich | Oct. 12, 1943 |
| 2,485,684 | Aldredge | Oct. 25, 1949 |
| 2,990,642 | Bloom et al. | July 4, 1961 |